US011354206B2

(12) United States Patent
Wada et al.

(10) Patent No.: US 11,354,206 B2
(45) Date of Patent: Jun. 7, 2022

(54) DISTRIBUTED PROCESSING METHOD, DISTRIBUTED PROCESSING SYSTEM, AND SERVER

(71) Applicant: Hitachi, Ltd., Tokyo (JP)

(72) Inventors: Yosuke Wada, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 16/812,704

(22) Filed: Mar. 9, 2020

(65) Prior Publication Data

US 2020/0364123 A1 Nov. 19, 2020

(30) Foreign Application Priority Data

May 14, 2019 (JP) .............................. JP2019-091362

(51) Int. Cl.
*G06F 11/20* (2006.01)
*H04L 67/10* (2022.01)

(52) U.S. Cl.
CPC .......... *G06F 11/2023* (2013.01); *H04L 67/10* (2013.01); *G06F 2201/805* (2013.01)

(58) Field of Classification Search
CPC ......... G06F 17/30371; G06F 17/30554; G06F 16/22; G06F 16/248; G06F 16/2365; G06F 11/187
See application file for complete search history.

(56) References Cited

U.S. PATENT DOCUMENTS

| 2003/0149709 | A1* | 8/2003 | Banks | G06F 16/273 |
| 2005/0166014 | A1* | 7/2005 | Kobayashi | G06F 3/0611 |
| | | | | 711/112 |
| 2006/0184627 | A1* | 8/2006 | Howell | G06F 11/187 |
| | | | | 709/205 |
| 2015/0112664 | A1* | 4/2015 | Srinivasan | G06F 40/30 |
| | | | | 704/9 |
| 2017/0011086 | A1* | 1/2017 | Fukunaka | G06F 16/2365 |
| 2017/0201590 | A1* | 7/2017 | Wojciechowski | G06F 11/2094 |

FOREIGN PATENT DOCUMENTS

WO 2015/186191 A 12/2015

* cited by examiner

*Primary Examiner* — Mahran Y Abu Roumi
(74) *Attorney, Agent, or Firm* — Mattingly & Malur, PC (57) ABSTRACT

A distributed processing method for executing partial order delivery of data on a plurality of computers connected via a network, the distributed processing method includes receiving the data by the plurality of computers. An output order in which the data is output by the partial order delivery is determined by the plurality of computers. The data to be output by dividing the data into a plurality of subsets equivalent among the plurality of computers and then stored in the output set.

8 Claims, 8 Drawing Sheets

Output Set (SERVER1-1), label 200-1:

| ITEM NAME | ARRAY ELEMENTS | | | | | | | | | | |
|---|---|---|---|---|---|---|---|---|---|---|---|
| OUTPUT ORDER | 1 | 2 | 3 | 4 | 5 | 6 | 7 | 8 | 9 | 10 | 11 |
| SET NUMBER | 1 | | | | 2 | | | | 3 | | |
| DATA | A | B | C | / | D | E | F | / | G | H | I |

Output Set (SERVER1-2), label 200-2:

| ITEM NAME | ARRAY ELEMENTS | | | | | | | | | | |
|---|---|---|---|---|---|---|---|---|---|---|---|
| OUTPUT ORDER | 1 | 2 | 3 | 4 | 5 | 6 | 7 | 8 | 9 | 10 | 11 |
| SET NUMBER | 1 | | | | 2 | | | | 3 | | |
| DATA | B | A | C | / | F | E | D | / | I | G | H |

FIG. 3

300 COMMUTATIVITY DETERMINATION TABLE

| | DATA A | DATA B | DATA C | .. | DIVISION COMMAND |
|---|---|---|---|---|---|
| DATA A | COMMUTATIVE | COMMUTATIVE | CONFLICTING | .. | CONFLICTING |
| DATA B | COMMUTATIVE | COMMUTATIVE | CONFLICTING | .. | CONFLICTING |
| DATA C | CONFLICTING | CONFLICTING | COMMUTATIVE | .. | CONFLICTING |
| : | : | : | : | : | : |
| DIVISION COMMAND | CONFLICTING | CONFLICTING | CONFLICTING | .. | CONFLICTING |

| 210-1 | ITEM NAME | ARRAY ELEMENTS | | | | | | | | |
|---|---|---|---|---|---|---|---|---|---|---|
| OUTPUT HISTORY (SERVER A1) | OUTPUT ORDER | 1 | 2 | 3 | 4 | 5 | 6 | 7 | 8 | 9 |
| | DATA | A | B | C | D | E | F | G | H | I |

| 210-2 | ITEM NAME | ARRAY ELEMENTS | | | | | | | | |
|---|---|---|---|---|---|---|---|---|---|---|
| OUTPUT HISTORY (SERVER A2) | OUTPUT ORDER | 1 | 2 | 3 | 4 | 5 | 6 | 7 | 8 | 9 |
| | DATA | B | A | C | F | E | D | I | G | H |

300 COMMUTATIVITY DETERMINATION TABLE

| | DATA Xa | DATA Xb | .. | DATA Ya | DATA Yb | .. | DIVISION COMMAND |
|---|---|---|---|---|---|---|---|
| DATA Xa | COMMU-TATIVE | CONFLICT-ING | .. | COMMU-TATIVE | COMMU-TATIVE | .. | CONFLICT-ING |
| DATA Xb | CONFLICT-ING | COMMU-TATIVE | .. | COMMU-TATIVE | COMMU-TATIVE | .. | CONFLICT-ING |
| : | : | : | : | : | : | : | : |
| DATA Ya | COMMU-TATIVE | COMMU-TATIVE | .. | COMMU-TATIVE | CONFLICT-ING | .. | CONFLICT-ING |
| DATA Yb | COMMU-TATIVE | COMMU-TATIVE | .. | CONFLICT-ING | COMMU-TATIVE | .. | CONFLICT-ING |
| : | : | : | : | : | : | : | : |
| DIVISION COMMAND | CONFLICT-ING | CONFLICT-ING | .. | CONFLICT-ING | CONFLICT-ING | .. | CONFLICT-ING |

300X COMMUTATIVITY DETERMINATION TABLE

CLASSIFICATION X

| | DATA Xa | DATA Xb | .. | DIVISION COMMAND X |
|---|---|---|---|---|
| DATA Xa | COMMU-TATIVE | CONFLICT-ING | .. | CONFLICT-ING |
| DATA Xb | CONFLICT-ING | COMMU-TATIVE | .. | CONFLICT-ING |
| : | : | : | : | : |
| DIVISION COMMAND | CONFLICT-ING | CONFLICT-ING | .. | CONFLICT-ING |

COMMUTATIVE

300Y COMMUTATIVITY DETERMINATION TABLE

CLASSIFICATION Y

| | DATA Ya | DATA Yb | .. | DIVISION COMMAND Y |
|---|---|---|---|---|
| DATA Ya | COMMU-TATIVE | CONFLICT-ING | .. | CONFLICT-ING |
| DATA Yb | CONFLICT-ING | COMMU-TATIVE | .. | CONFLICT-ING |
| : | : | : | : | : |
| DIVISION COMMAND | CONFLICT-ING | CONFLICT-ING | .. | CONFLICT-ING |

DISTRIBUTED PROCESSING METHOD, DISTRIBUTED PROCESSING SYSTEM, AND SERVER

CLAIM OF PRIORITY

The present application claims priority from Japanese patent application JP 2019-91362 filed on May 14, 2019, the content of which is hereby incorporated by reference into this application.

BACKGROUND

This invention relates to a distributed processing system configured to process data with a plurality of servers.

A distributed processing system secures availability by multiplexing data on a plurality of servers and switching processing of one of the servers that is experiencing a failure to another server. With an improvement of hardware performance in recent years, processing ability per unit time has improved, and a loss increases as well in proportion to how long the switching described above takes to complete. In the field of stock exchange, the number of transactions is directly linked to profit, and the speeding up of switching from a server experiencing a failure is therefore a great matter of interest.

As a method of accomplishing high speed switching when a failure occurs, there has been known a partial order delivery technology, which is a type of leader-less distributed consensus (for example, WO 2015/186191 A1).

With the partial order delivery technology, there is no leader and all servers are equal so that processing can be continued even after a failure occurs in any one of the servers. Another characteristic of the partial order delivery technology is that distributed consensus guarantees data consistency even when the switching takes place while the server experiencing a failure is still on the way to complete shutdown, and the partial order delivery technology is accordingly an important technology in securing availability.

SUMMARY

The partial order delivery technology described above is a technology in which data is delivered to a plurality of processing units, and the processing units output the data in an order of consistency from the viewpoint of the processing units. In partial order delivery, each server keeps a set of past output data (an output set) in order to prevent outputting duplicate data. A problem is that elements of the output set are not deleted appropriately by any existing method, and consequently require a large storage capacity when partial order delivery is implemented in a distributed processing system.

This invention has been made in view of the problem described above, and an object of this invention is therefore to continue processing even after a failure occurs in some server and appropriately manage an output set while securing data consistency.

According to one aspect of the present invention, a distributed processing method for executing partial order delivery of data on a plurality of computers includes receiving the data by the plurality of computers. An output order in which the data is output by the partial order delivery is determined by the plurality of computers. The data to be output by dividing the data into a plurality of subsets equivalent among the plurality of computers and then stored in the output set.

Therefore, according to at least one embodiment of this invention, the deletion of data from the output sets of the servers, the prevention of duplicate output among the servers, and supplementation among the servers can efficiently be managed by generating a division command and applying the division command to data of partial order delivery. Other objects, configurations, and effects which have not been described above become apparent from embodiments to be described hereinafter.

DETAILED DESCRIPTION OF THE EMBODIMENTS

Now, at least one embodiment of the present invention is described with reference to the accompanying drawings.

First Embodiment

Figure 1:
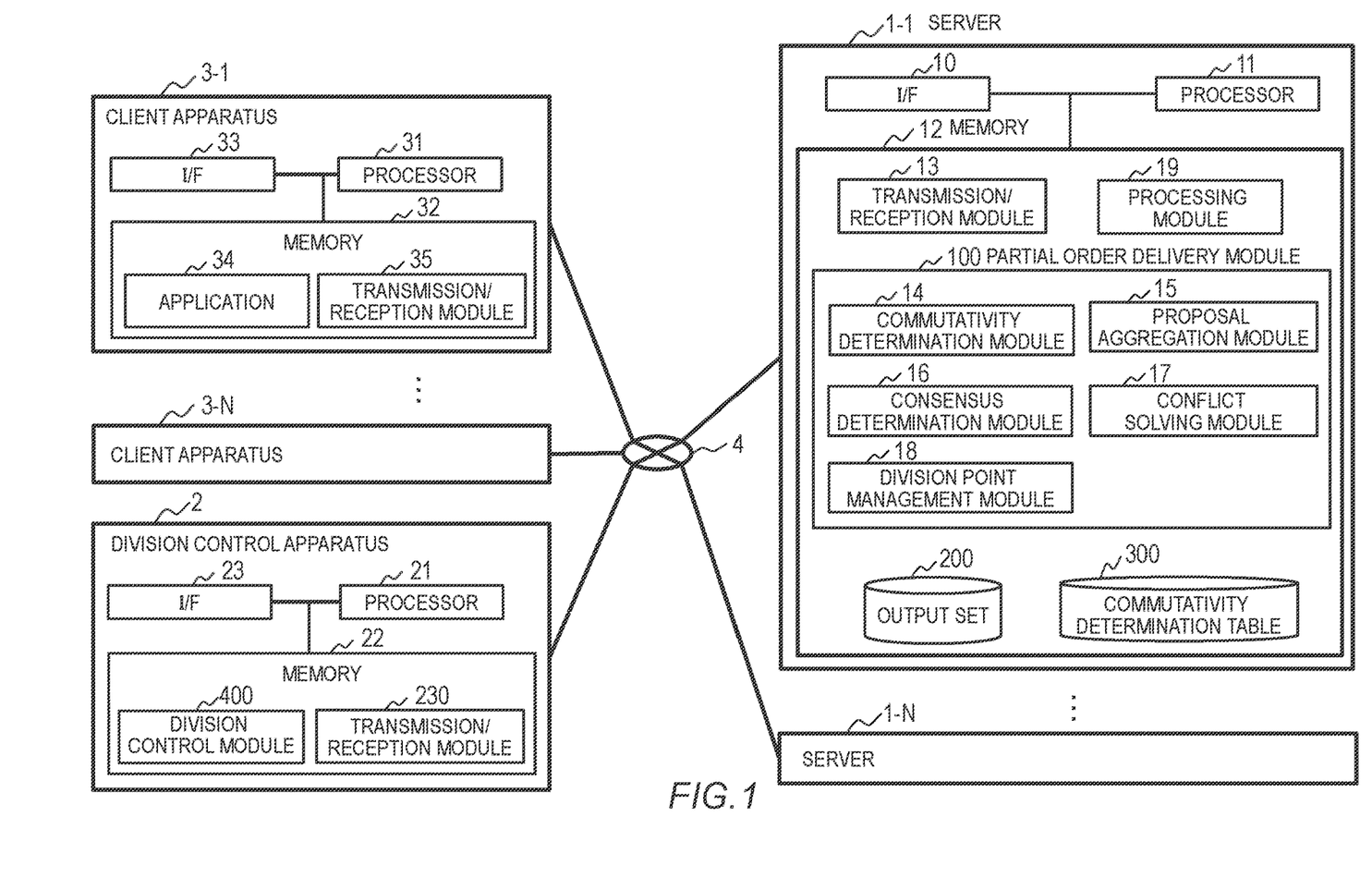
FIG. 1 is a block diagram for illustrating an example of a configuration of a distributed processing system according to a first embodiment of this invention.

FIG. 1 is a block diagram for illustrating an example of a configuration of a distributed processing system according to a first embodiment of this invention. The distributed processing system includes a plurality of servers 1-1 to 1-N, which are configured to receive data from a plurality of client apparatus 3-1 to 3-N to execute processing of the data, a division control apparatus 2 configured to transmit data division information to the servers 1-1 to 1-N, and a network 4 configured to connect the apparatus and the servers.

In the following description, a reference symbol "1" with "-" and the subsequent number/letter omitted is used when the servers are not individually identified. The same rule applies to the reference symbols of other components. The servers 1-1 to 1-N have the same configuration. The client apparatus 3-1 to 3-N have the same configuration.

Each client apparatus 3 is a computer including a processor 31, a memory 32, and an interface 33. An application 34 and a transmission/reception module 35 are loaded as programs onto the memory 32 to be executed by the processor 31.

The application 34 generates data to be processed by the servers 1, and the transmission/reception module 35 transmits the data to the servers 1.

Each server 1 is a computer including a processor 11, a memory 12, and an interface 10. The memory 12 stores a transmission/reception module 13, a partial order delivery module 100, a processing module 19, an output set 200, and a commutativity determination table 300.

The partial order delivery module 100 includes a commutativity determination module 14, a proposal aggregation module 15, a consensus determination module 16, a conflict solving module 17, and a division point management module 18. The partial order delivery module 100 outputs data received from the transmission/reception module 13 to the processing module 19 while guaranteeing consistency of the data among the other servers 1 by the partial order delivery technology. The processing module 19 executes given processing in the order of data output from the partial order delivery module 100. Consistency in the partial order delivery technology means that the final result of processing, by the processing module, received data that has an interchangeable order (is commutative) and that is output to the processing module in an order varying from one server 1 to another server 1 is the same in the processing module of every server 1 as described in, for example, the second and third embodiments of WO 2015/186191 A1.

The transmission/reception module 13, the commutativity determination module 14, the proposal aggregation module 15, the consensus determination module 16, the conflict solving module 17, the division point management module 18, and the processing module 19 are loaded as programs onto the memory 12 to be executed by the processor 11.

The processor 11 operates as function modules that provide given functions by executing processing as programmed by the programs of the function modules. For instance, the processor 11 functions as the consensus determination module 16 by executing a consensus determination program. The same applies to other programs. The processor 11 further operates as a function module that provides the function of each of a plurality of processing procedures executed by each program. The computers and a computer system are apparatus and a system that include those function modules.

The programs for implementing the functions of the partial order delivery module 100 as well as the table and other types of information may be stored in a storage sub-system or a non-volatile semiconductor memory (not shown), or on a hard disk drive, a solid state drive (SSD), or other storage devices (not shown), or on an IC card, an SD card, a DVD, or other computer-readable non-transitory data storage media (not shown).

The partial order delivery module 100 determines the commutativity of data received from the client apparatus 3 or the division control apparatus 2 (the commutativity determination module 14), and exchanges the results of the commutativity determination and the data with other servers 1 to gather the results and the data in the proposal aggregation module 15.

The partial order delivery module 100 then determines whether a consensus can be formed from the aggregated commutativity determination results and data (the consensus determination module 16) and, when there is a conflict in the commutativity determination results, changes the data output order of conflict data between other servers 1 so that the conflict is solved (the conflict solving module 17). The partial order delivery module 100 assigns a set number in the output set 200 to a subset of the output data (the division point management module 18), and outputs the output data as a consensus value to the processing module 19. The partial order delivery module 100 also stores a history of the output data in the output set 200, and uses the set number to manage the data.

Figure 2:
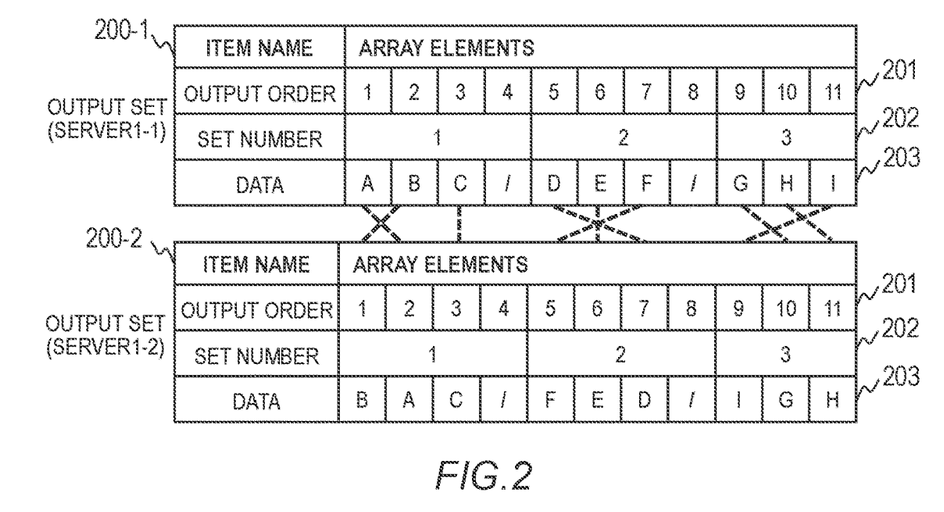
FIG. 2 is a diagram for illustrating an example of the output set according to the first embodiment of this invention.

FIG. 2 is a diagram for illustrating an example of the output set 200. In the illustrated example, the output set 200-1 of the server 1-1 and the output set 200-2 of the server 1-2 are compared.

The output sets 200 each include an output order 201, a set number 202, and data 203. Numbers assigned to output data by the division point management module 18 are stored in the output order 201. Serial numbers, for example, may be used as the assigned numbers. The content of the received data is stored as the data 203.

The set number 202 is an identifier assigned to a set of output data by the division point management module 18, and is a value unique within each server 1. The first embodiment gives an example in which a serial number is employed as the set number 202. The division point management module 18 receives a division command from the division control apparatus 2, then adds "1" to the current set number 202, and attributes the next output data to a subset having the new set number 202.

A single subset to which the set number 202 is assigned accordingly contains output data that is output in a period from the last division command to the next division command.

The first embodiment gives an example in which, when the division point management module 18 receives a division command, data of "/" is stored in the output set 200 as a division point (division information). In the output set 200, a set of output data can be managed with the set number 202, and a division point as the data 203 may therefore be omitted.

In the illustrated example, the server 1-1 outputs the data 203 in the order of "A", "B", and "C", and a division point is stored in the fourth place ("4") in the output order 201. The server 1-2 outputs the data 203 in the order of "B", "A", and "C", and a division point is stored in the fourth place ("4") in the output order 201.

In the illustrated example, the commutativity determination module 14 determines the data "A" and the data "B" as "commutative", and determines "A" and "C" and "B" and "C" as "conflicting". The partial order delivery module 100 therefore outputs commutable data among the servers 1 without making the order uniform, but outputs the conflicting data with the same order.

Data having the same set number 202 in each server 1 is in a partial order, but the result of processing the data having the same set number 202 with the processing module 19 is equivalent to a total order in which the order of data is matched among all servers 1. A data set output from the partial order delivery module 100 in the first embodiment for each set number 202 separately can therefore be treated as a data set that is in the total order.

Figure 3:
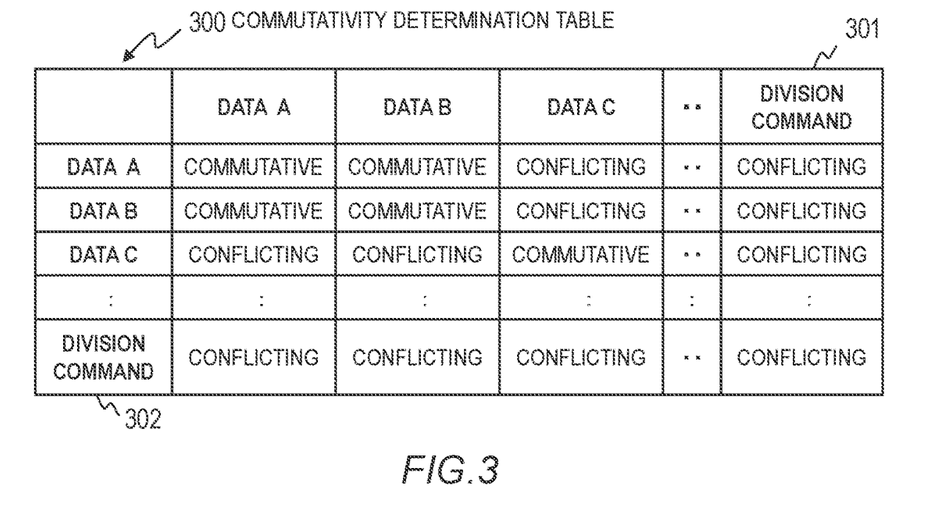
FIG. 3 is a diagram for illustrating a commutativity determination table according to the first embodiment of this invention.

FIG. 3 is a diagram for illustrating a commutativity determination table 300. One of "commutative" and "conflicting" is set in advance to each cell of the commutativity determination table 300 to indicate the commutativity of data 302, which is received data yet to be output, with respect to compared data 301.

For instance, when the currently received compared data 301 is "Data B" and the data 302, which is received data yet to be output, is "Data A", the commutativity determination module 14 determines that "Data B" is commutative by referring to the commutativity determination table 300. The commutativity determination module 14 determines any combination as "conflicting" when a division command is received.

In other words, a division command output by the division control apparatus 2 is defined as data noncommutative with respect to every piece of data. The division command, which is data for control in partial order delivery, is also not output to the processing module 19 from the partial order delivery module 100. Alternatively, the processing module 19 may receive and ignore, or discard, the division command.

Figure 4:
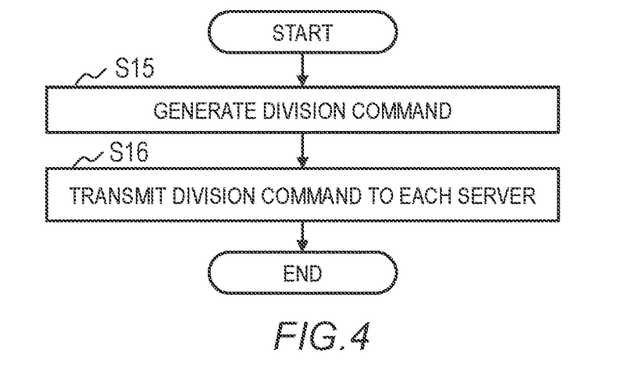
FIG. 4 is a flow chart for illustrating an example of processing to be executed in the division control apparatus according to the first embodiment of this invention.

FIG. 4 is a flow chart for illustrating an example of processing to be executed in the division control apparatus 2. The processing of this flow chart is executed at given timing. The given timing is, for example, a given cycle or the reception of a request from another computer.

When the given timing arrives, a division control module 400 generates a division command defined in advance (Step S15). Next, a transmission/reception module 23 transmits the division command generated by the division control module 400 to each server 1 (Step S16).

When the client apparatus 3 transmit data to the servers 1 at the timing of transmission of the division command from the division control apparatus 2, each server 1 determines an order in the conflict solving module 17, which is described later, to determine the order of outputting the division command and the data.

When the division control apparatus 2 transmits the division command while data is not transmitted from the client apparatus 3, on the other hand, each server 1 receives the division command alone. The server 1 therefore does not determine the received command as conflicting, and processes the received command without using the conflict solving module 17.

When there is a conflict between data and the division command, each server 1 uses the conflict solving module 17 to form a consensus with other servers 1, so that the order of the division command and the data is matched in all servers 1. When each server 1 receives the division command alone, on the other hand, the output order is not rearranged because there is no other data, and all servers 1 have a matching output order. The order of outputting the received division command is thus matched in each server 1.

Which one of data from the client apparatus 3 and the division command precedes the other in the output order cannot be changed, and the data and the division command therefore have a property that ensures that data output from one server 1 before the division command precedes the division command in output from other servers 1 as well. Accordingly, whether the data is output before or after the division command does not vary among the servers 1, and data in a subset (the set number 202) generated from the output set 200 with the division command as a boundary is equivalent among the servers 1.

In the first embodiment, equivalent subsets mean a match among the servers 1 in terms of the output result of the processing module 19, even when the data 203 and the output order 201 do not match among the servers 1. The division point management module 18 of each server 1 assigns the set number 202 that is a serial number as a value by which a subset is identified.

Data having the same set number 202 is equivalent among all servers 1. Data deletion, the prevention of duplicate output, data supplementation, and the like in the output set 200 can therefore be managed with the set number 202.

Figure 5:
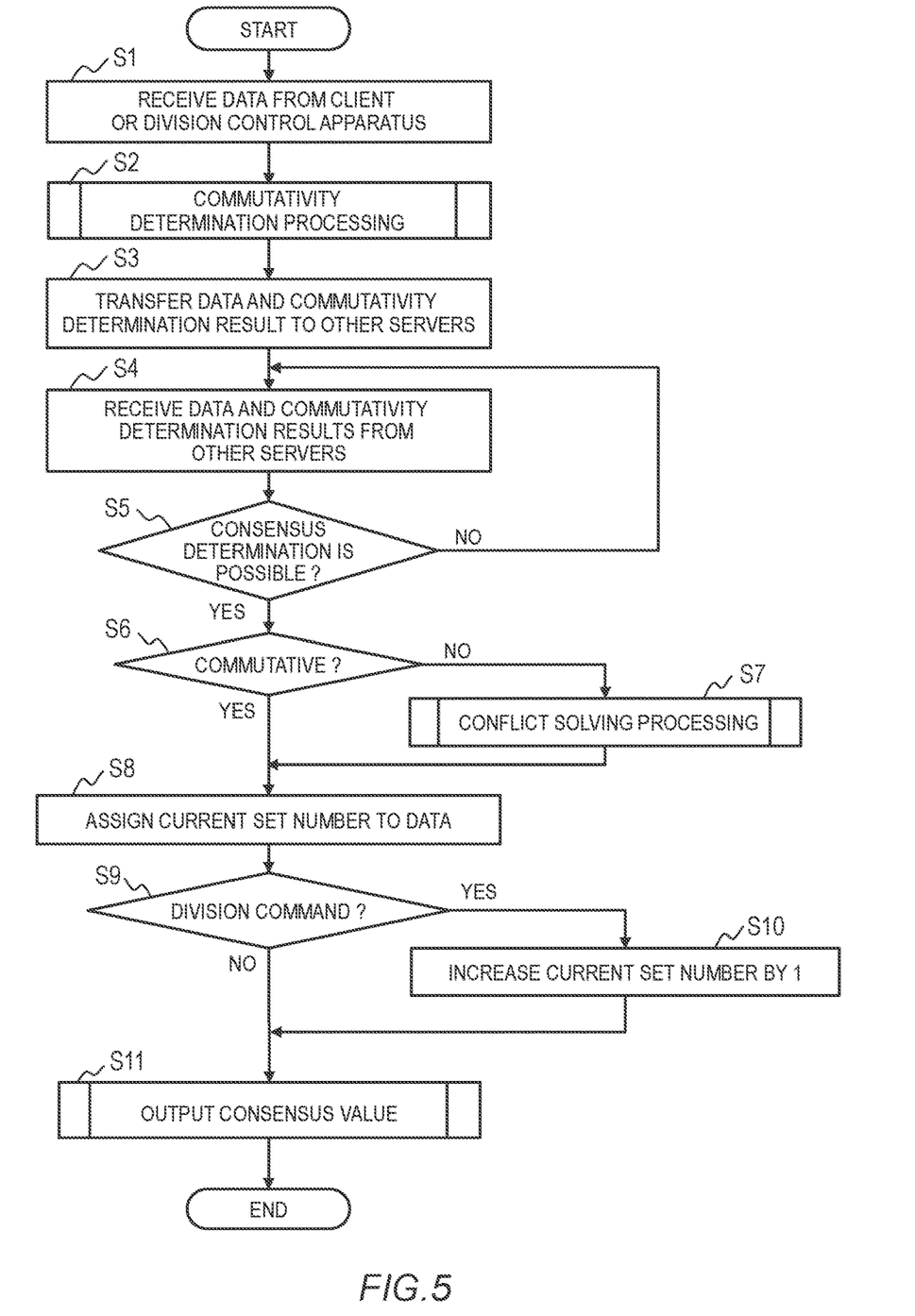
FIG. 5 is a flow chart for illustrating an example of control to be executed on each server according to the first embodiment of this invention.

FIG. 5 is a flow chart for illustrating an example of control to be executed on each server 1. This processing is executed when the server 1 receives data from the client apparatus 3 or a division command from the division control apparatus 2.

The transmission/reception module 13 of the server 1 receives data from the client apparatus 3 or a division command from the division control apparatus 2 (Step S1). The commutativity determination module 14 refers to the commutativity determination table 300 set in advance to determine that the data obtained from the transmission/reception module 13 is "commutative" when the data is processible irrespective of the order, and as "conflicting" when the order of the data requires to be matched among the servers 1 before the data is processed.

The conflict solving module 17 transmits the received data and the result of the commutativity determination to the other servers 1 (Step S3). Next, the proposal aggregation module 15 receives data and commutativity determination results from other servers 1 (Step S4).

The consensus determination module 16 determines, from the data and commutativity determination results received from other servers 1, whether a consensus can be formed (Step S5). The consensus determination module 16 executes consensus determination when the number of servers 1 from which data and commutativity determination results have been received is large enough to execute consensus determination. When the number is not large enough for consensus determination, the processing returns to Step S4 to receive data and determination results from other servers 1. A given number of servers 1 out of all servers 1 are sufficient as servers that form a consensus.

When it is determined that a consensus can be formed among the servers 1 by exchanging data and determination results, the commutativity determination module 14 determines, based on the commutativity determination result of Step S2 described above, whether the data received by the proposal aggregation module 15 is commutative (Step S6). When all pieces of received data are commutative with one another, the processing proceeds to Step S8, with the current data as output data. When the received data includes conflicting data, the processing proceeds to Step S7.

In Step S7, the conflict solving module 17 consults with the conflict solving modules 17 of the other servers 1 to determine the order of the data determined as noncommutative (conflicting), and determine output data. Paxos consensus or other known technologies may be employed as a method by which the conflict solving module 17 determines the order.

The division point management module 18 assigns the set number 202 and the output order 201 to the output data determined in Step S6 or Step S7, and stores the output data as the data 203 in the output set 200 (Step S8).

The division point management module 18 next determines whether the currently processed data is a division command (Step S9). The division point management module 18 proceeds to Step S10 when the currently processed data is a division command, and otherwise proceeds to Step S11.

In Step S10, the division point management module 18 adds "1" to the set number 202 to newly set a subset in which the next data is to be stored. In Step S11, the division point management module 18 outputs the data to which the set number 202 has been assigned in Step S8 to the processing module 19 as a consensus value, and the processing is then ended.

In the first embodiment, an example in which communication among the servers 1 by partial order delivery is held once is described. This invention, however, is not limited thereto, and communication among the servers 1 may be held twice or more.

In the first embodiment, the order of outputting data matches in all servers 1 when conflicts are solved by the conflict solving module 17, and can accordingly be utilized as well as a division command to generate a subset of the output set 200. For example, the number of generated division points can be reduced by treating the last data in an output order that is determined by the conflict solving module 17 in the same way as that for a division command. Alternatively, the subset size can be equalized by treating data in the output order in the same way as that for a division command for every given number of pieces of output data.

<Comparison to Related-Art Example>

In the partial order delivery technology of the related-art example described above, data transmitted from client apparatus is output to the processing modules in an order that avoids inconsistency among the processing modules. The servers exchange the data received from the client apparatus with one another to reach a consensus that a conflict among the servers is avoided with regards to the data output order, and then output the data to the processing modules.

When a failure occurs in some server, the partial order delivery technology avoids the shutting down of the distributed processing system by outputting data to the processing module at the time a consensus is formed among a prescribed number of servers, instead of waiting for all servers to form a consensus. Each server keeps a past output history in order to prevent duplicate output of delayed data received from the servers that are not included among the prescribed number of servers.

The partial order delivery technology of the related-art example does not prescribe how the output history is deleted, and therefore has a problem in that the output history keeps growing. The output history according to the partial order delivery technology of the related-art example is illustrated in FIG. 6.

Figure 6:
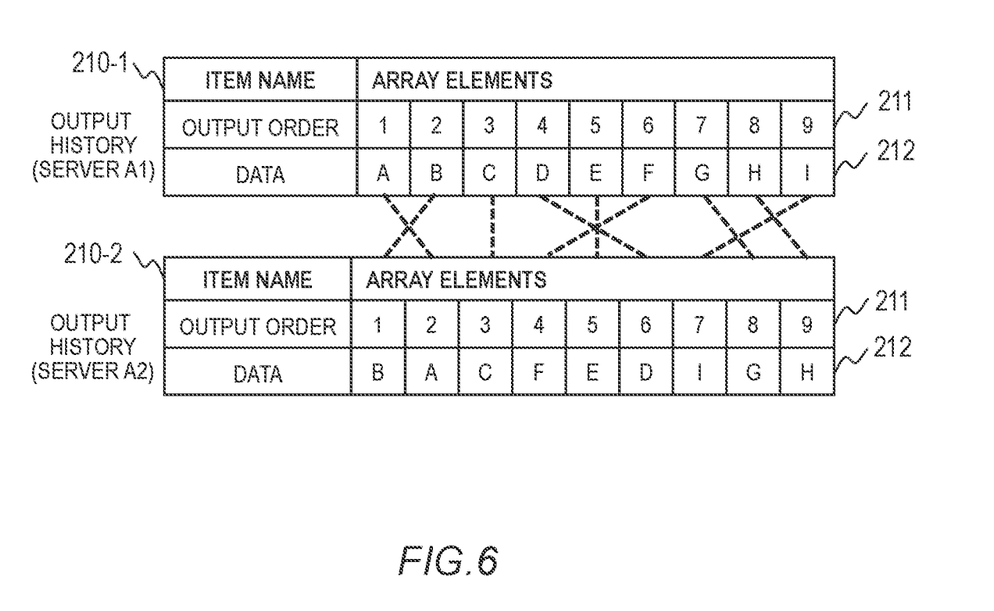
FIG. 6 is an illustration of an example of an output history 210-1 of a server and an output history of a server according to the first embodiment of this invention.

FIG. 6 is an illustration of an example of an output history 210-1 of a server A1 and an output history 210-2 of a server A2. The servers A1 and A2 of the related-art example receive data from client apparatus 3 similarly to the servers 1 in the first embodiment. The output histories 210 each include an output order 211 and data 212.

In the output history 210-1 of the server A1, the data 212 that is in the fourth place ("4") in the output order 211 is "D", whereas the data 212 that is "D" is in the sixth place ("6") in the output order 211 in the output history 210-2 of the server A2, which indicates that the data has arrived at the server A2 with a delay.

In this related-art example, when the pieces of data 212 that are in the first place ("1") to the fourth place ("4") in the output order 211 are deleted, the server A2, which receives the data 212 that is "D" with a delay, executes duplicate transmission of "D" to other servers because "D" is not in the output history 210-2 due to the deletion.

The related-art example may deal with this by cross-checking data between the servers A and thus adjusting which data can be deleted. The method, however, is impractical because an increase in number of elements of the output histories 210 or an increase in number of servers leads to a huge number of combinations, with the result that the volumes of processing and communication are pushed to an excessive level.

In contrast, the distributed processing system of the first embodiment accomplishes data management on a subset-by-subset basis by inserting a division command in partial order delivery to divide elements of the output set 200 into a plurality of subsets, and assigning the set number 202, which is a sequential number, to each subset.

As described above, data in a subset (the set number 202) is equivalent among all servers 1, and data deletion, the prevention of duplicate output, and the like in the output set 200 can therefore be managed with the set number 202.

This enables the distributed processing system to continue processing even after a failure occurs in some server 1 and appropriately manage the output set 200 while securing the consistency of output data.

Although an example of placing the conflict solving module 17 in the partial order delivery module 100 of each server 1 is described in the first embodiment, this invention is not limited thereto. The conflict solving module 17 may be executed by a computer other than the server 1.

Second Embodiment

Figure 7:
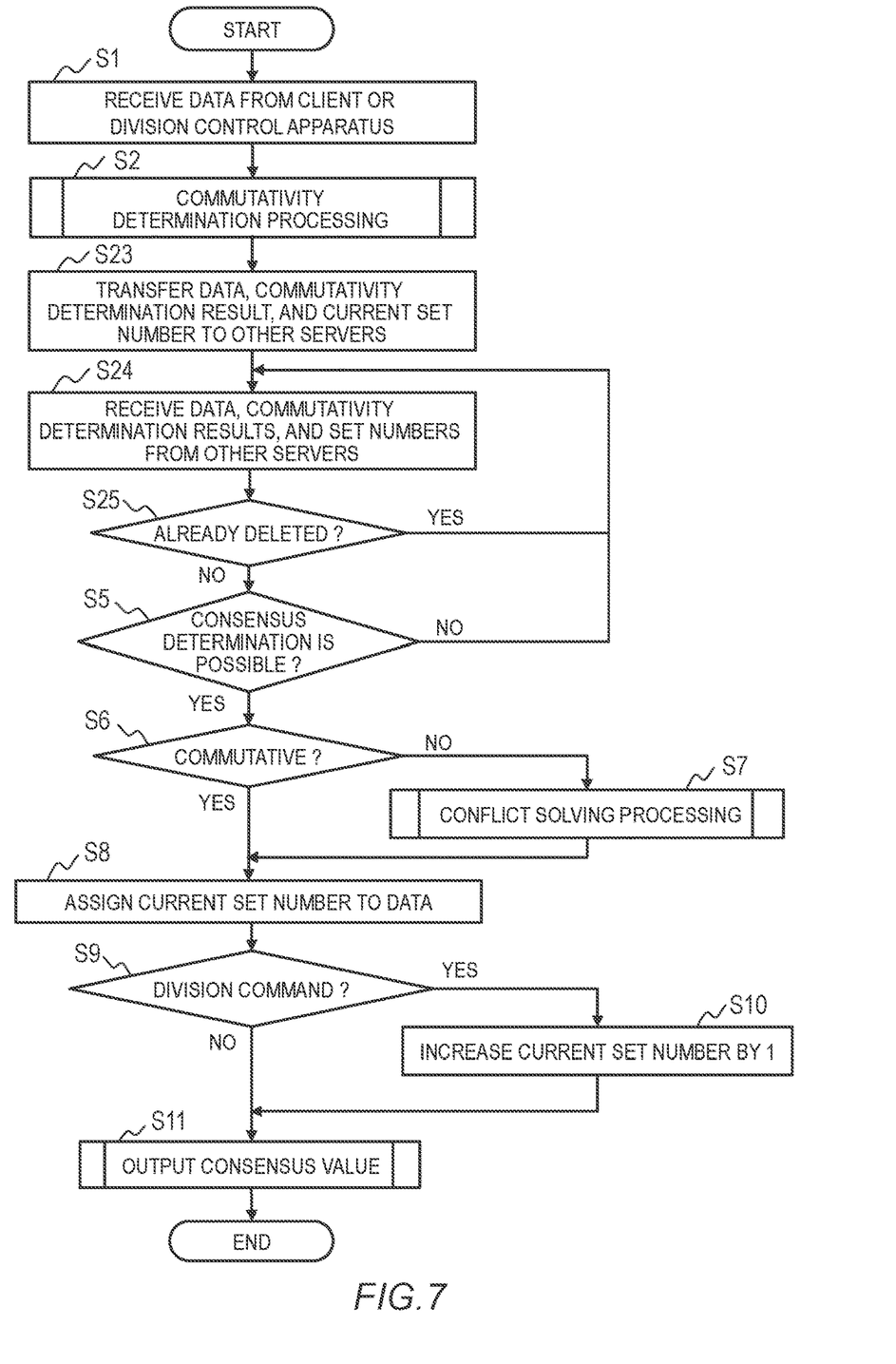
FIG. 7 is a flow chart for illustrating an example of processing to be executed in each server in a second embodiment of this invention.

FIG. 7 is a flow chart for illustrating an example of processing to be executed in each server 1 in a second embodiment of this invention. The flow chart of FIG. 7 is obtained by partially modifying the flow chart of FIG. 5 in the first embodiment, and Steps S1, S2, and S5 to S11 are the same as the ones in the first embodiment.

An example of detecting a deleted subset by exchanging the set number 202 between the servers 1 is described in the second embodiment. The deletion of a subset is executed by other processing at given timing. Duplicate descriptions of parts that are the same as those in the first embodiment are omitted.

In Step S23, the consensus determination module 16 transmits the received data and the commutativity determination result as well as the current set number 202 to other servers 1. In the next Step S24, the proposal aggregation module 15 receives data and commutativity determination results as well as the current set number from other servers 1.

In Step S25, the division point management module 18 determines whether the set number 202 received from another server 1 has already been deleted. When it is determined that the set number 202 has been deleted, the division point management module 18 discards the received data, and the processing returns to Step S24 to receive data and determination results as well as the set number 202 from other servers 1. When it is determined that the receives set number 202 exists in the output set 202, on the other hand, the division point management module 18 proceeds to Step S5 to execute the processing described in the first embodiment.

When one server 1 finds out, through the exchange of the set number 202 between the servers 1, that the set number 202 received from another server 1 into its own output set 200 is smaller than the smallest set number 202 in its own output set 200, the division point management module 18 determines that the received set number 202 has already been deleted, and discards the relevant data. In this manner, duplicate output from the server 1 can be prevented when data received from another server 1 is received with a delay.

Each server 1 holds the output set 200 divided into subsets by division commands, and deletes the subsets in ascending order of the set number 202 when a division number (the value of the set number 202) or a total data amount exceeds a given threshold value. This can prevent computer resources used by the servers 1 from increasing, and consequently reduce cost by simplifying the configuration of the servers 1.

The division point management module 18 of one server 1 determines, when the set number 202 received from another server 1 is smaller than the smallest set number 202 in its own output set 200, that the received set number 202 has been deleted, and discards the received data.

When the set number 202 received from another server 1 is equal to or larger than the smallest set number 202 in its own output set 200, on the other hand, the division point management module 18 hands over the processing to the consensus determination module 16.

Third Embodiment

Figure 8:
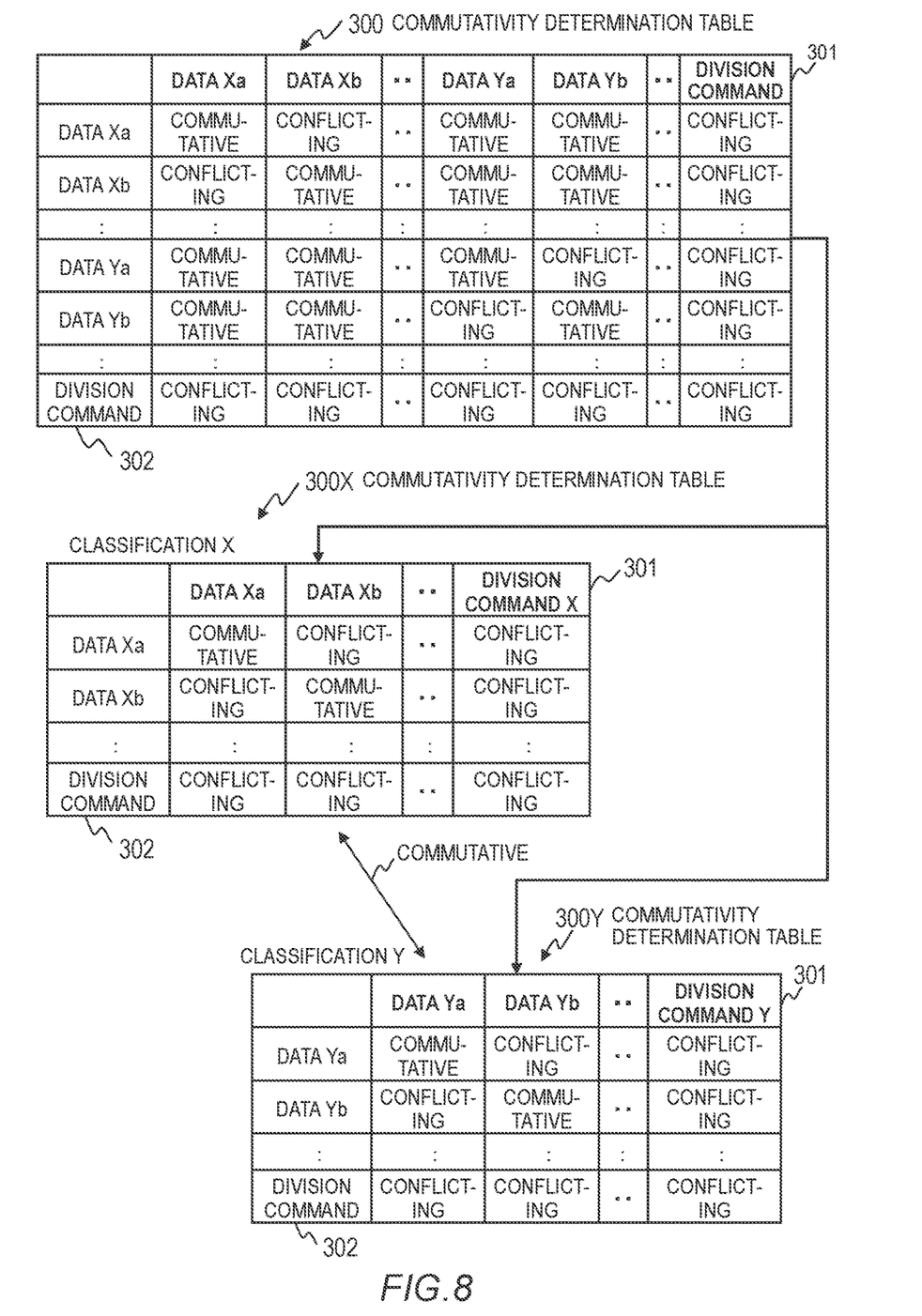
FIG. 8 is a diagram for illustrating an example of the commutativity determination table in a third embodiment of this invention.

FIG. 8 is a diagram for illustrating an example of the commutativity determination table 300 in a third embodiment of this invention. When data from the client apparatus 3 is in an independent group (or series), the commutativity determination table 300 is divided for each data series in the third embodiment.

When data received from the client apparatus 3 is classified into an X-series and Y-series independent of each other, the commutativity determination table 300 is divided into a commutativity determination table 300X of the X-series and a commutativity determination table 300Y of the Y-series. The data is defined as commutative between different series, and a division command is delivered for each data series as well. Specifically, a division command X is delivered to the X-series and a division command Y is delivered to the Y-series. The output set 200 is managed by handling the set number 200 for each data series separately. The rest of the configuration is the same as the one in the first embodiment.

In the partial order delivery technology, when received data is a plurality of pieces of data that vary in final state at (processing result of) the processing module 19 depending on the order in which the data is output from the partial order delivery module 100, the conflict solving module 17 is used to determine the order.

During a period in which a conflict is being solved by the conflict solving module 17, output data is unsettled and the partial order delivery module 100 therefore cannot output data, which means that the latency increases in proportion to the length of processing time of the conflict solving module 17. When the server 1 then receives a division command and another type of data, a conflict is to be solved by the conflict solving module 17.

The third embodiment addresses the issue by dividing the commutativity determination table 300 for each data series (classification) into the commutativity determination tables 300X and 300Y, and separating a division command for each data series into the division commands X and Y. Ranges of conflict with the division commands X and Y are thus smaller than the range of conflict in the original commutativity determination table 300, and fewer conflicts are accordingly caused, which helps to reduce the latency due to the conflict solving module 17.

When some data spans a plurality of series, the data is required to be defined for each of the commutativity determination table 300X of the X-series and the commutativity determination table 300Y of the Y-series. The data spanning a plurality of series is assigned the set number 202 for each series, and the division point management module 18 manages each set number 202 to handle the set number 202 for each of the division command X of the X-series and the division command Y of the Y-series separately.

Fourth Embodiment

Figure 9:
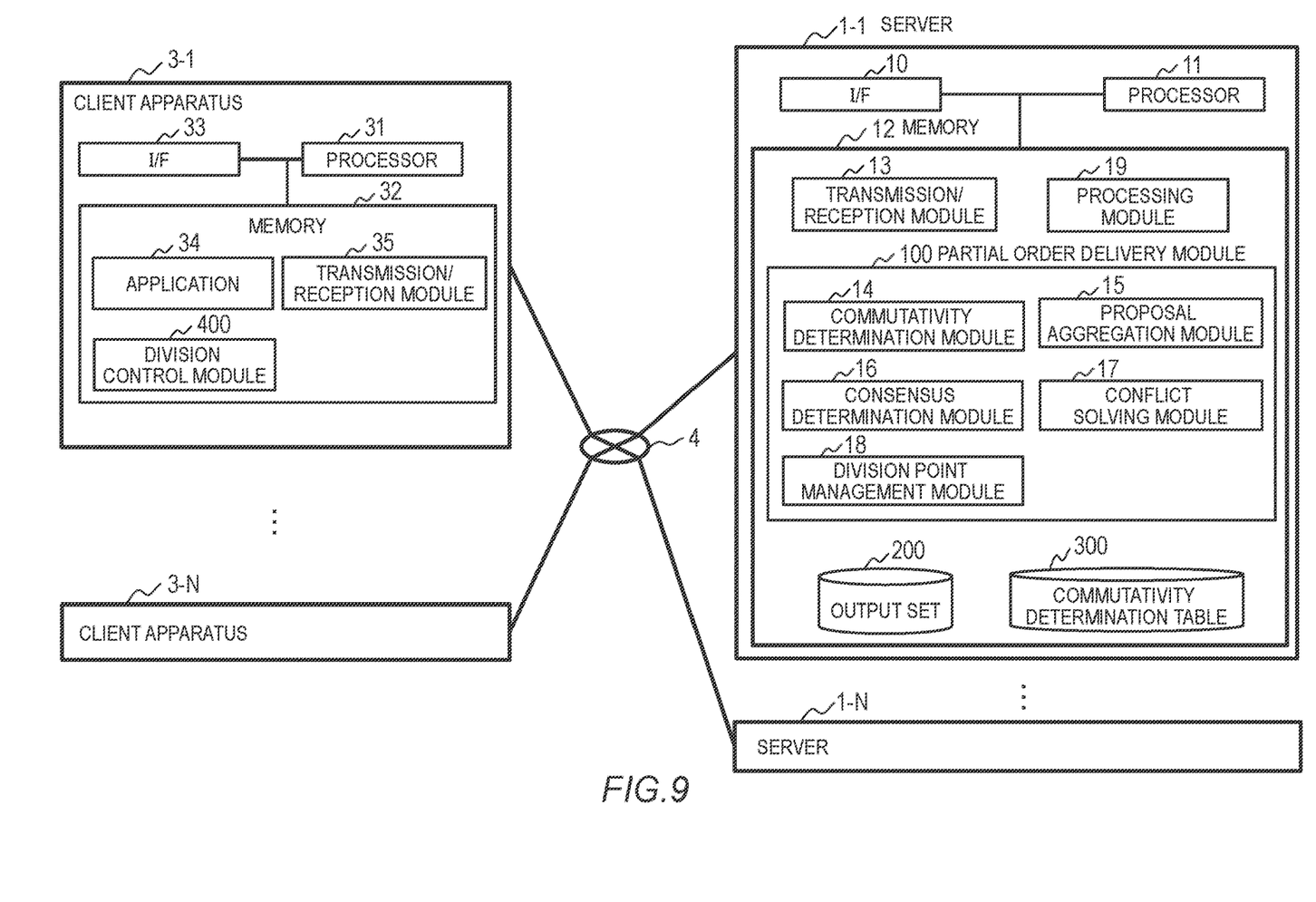
FIG. 9 is a block diagram for illustrating an example of a configuration of a distributed processing system according to a fourth embodiment of this invention.

FIG. 9 is a block diagram for illustrating an example of a configuration of a distributed processing system according to a fourth embodiment of this invention. In the fourth embodiment, the division control module 400 configured to generate a division command is placed in each client apparatus 3. The rest of the configuration in the fourth embodiment is the same as the one in the first embodiment.

When the series of data to be transmitted to the servers 1 varies for each of the client apparatus 3-1 to 3-N, the timing of transmitting a division command and data can be controlled by running the division control module 400 on the client apparatus 3.

When the division control module 400 is run on a computer other than the client apparatus 3, the computer is required to cooperate with the client apparatus 3 in order to control the timing of transmitting a division command, and communication for the cooperation is required.

In contrast, when the division control module 400 is run on each client apparatus 3 as in the fourth embodiment, the timing of transmitting a division command and data can be controlled without cooperating with other computers (other client apparatus 3 and the division control apparatus 2).

Fifth Embodiment

Figure 10:
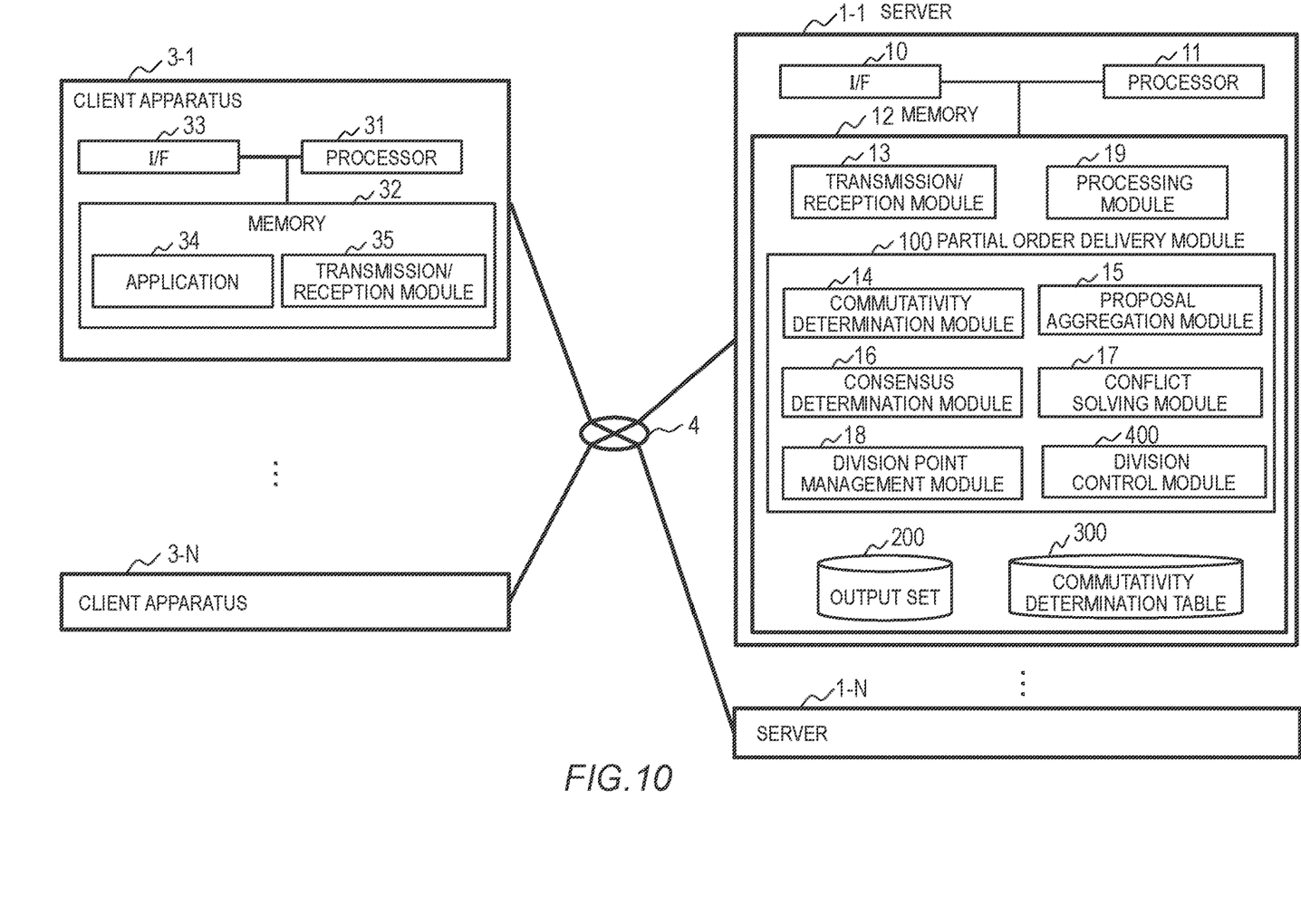
FIG. 10 is a block diagram for illustrating an example of a configuration of a distributed processing system according to a fifth embodiment of this invention.

FIG. 10 is a block diagram for illustrating an example of a configuration of a distributed processing system according to a fifth embodiment of this invention. In the fifth embodiment, the division control module 400 configured to generate a division command is placed in each server 1. The rest of the configuration in the fifth embodiment is the same as the one in the first embodiment.

When the series of data to be transmitted to the servers 1 is indefinite for each of the client apparatus 3-1 to 3-N, the timing of transmitting a division command and data can be controlled by running the division control module 400 on each server 1.

In this case, the distributed processing system transmits data of a specific classification to a specific server 1, instead of transmitting data from the client apparatus 3 to all servers 1. The server 1 receiving data of a specific classification executes division control, and then delivers the data to each server. The timing of transmitting a division command and data can thus be controlled as in the third embodiment.

Sixth Embodiment

As described in the first and second embodiments, data subsets having the same set number 202 are equivalent in all servers 1 and, when a subset is treated as a single piece of data, it can therefore be considered that the form of the output set 200 matches the one in total order delivery.

The partial order delivery technology of this invention is accordingly applicable to a known total order delivery technology. For example, the partial order delivery module 100 and the division control module 400 can be used for the recovery of the output set 200, scale out, rebalancing, and the like.

However, in scale-out and other types of processing in which the number of servers 1 is changed, the prescribed number of data exchange changes and, when a command to change the number of servers 1 is delivered at the set number 202 that is X and the prescribed number is immediately changed, a mismatch in prescribed number therefore occurs between one server 1 and another server 1, which leads to inconsistency in delivery result.

Accordingly, after the command to change the number of servers is delivered at the subset number 202 that is X, control in which the change is reflected at a subset number that is X+α (where α≥1) or a subsequent subset number is required.

In order to accomplish the above, the following two are required.

(A) The total number of division commands transmitted by the division control module 400 is kept under α. When a division command is issued for each data classification (data series) separately, the total number of division commands is counted for each classification as well. When the division control module 400 is placed in each of a plurality of client apparatus 3 or each of a plurality of servers 1, the number of division commands transmitted from all division control modules 400 is required to be kept under α. To give a simple example, the division control modules 400 may perform control that sets the number of division commands in each of the division control modules 400 to α/the number of division control modules 400 or less.

(B) When the set number 202 assigned to data and a commutativity determination result that are received by data exchange is equal to or more than X+α, the proposal aggregation module 15 temporarily evacuates the content, supplements information having the subset number 202 that is X from other servers 1, and then continues the processing.

In the first to sixth embodiments, an example in which a division command is transmitted while data is transmitted from the client apparatus 3 is described. However, data to which a division flag is set in advance may function as a division command to enable the server 1 that receives data having the division flag to execute the same processing as that executed when the division command is received.

<Conclusion>

As described above, the distributed processing systems according to the first to sixth embodiments may have configurations given below.

(1) There is provided a distributed processing method for executing partial order delivery of data on a plurality of computers (the server 1 and the client apparatus 3) connected via a network (4), the distributed processing method including: receiving (the transmission/reception module 13) the data by the plurality of computers (1); determining (the commutativity determination module 14, the proposal aggregation module 15, the consensus determination module 16, and the conflict solving module 17), by the plurality of computers (1), an output order in which the data is output by the partial order delivery; and managing (the division point management module 18), by the plurality of computers (1), the data to be output by dividing the data into a plurality of subsets equivalent among the plurality of computers before the data is stored in an output set (200), and storing the divided data in the output set (200).

With the configuration described above, each server 1 divides elements of the output set 200 into a plurality of subsets, and assigns the set number 202 that is a sequential number to each of the subsets, to thereby accomplish data management on a subset-by-subset basis. This enables the distributed processing system to continue processing even after a failure occurs in some server 1 and appropriately manage the output set 200 while securing data consistency.

(2) The distributed processing method according to the above-mentioned item (1) further includes outputting (the division control module 400), by the plurality of computers (1), a division command, which is data noncommutative with the data that can be handled in the partial order delivery, and the managing (the division point management module 18) includes generating, when the division command is stored in the output set (200), a division point (the set number 202) based on the division command, and managing the output set on a subset-by-subset basis by dividing the output set (200) at the division point.

With the configuration described above, the server 1 receiving the division command segments the output set 200 at a division point (the set number 202), to thereby manage data on a subset-by-subset basis. Data having the same set number 202 in each server 1 is in a partial order, whereas the result of processing the data having the same set number 202 with the processing module 19 is equivalent to a total order in which the order of data is matched among all servers 1. The output set 200 can thus be managed appropriately while guaranteeing the consistency of output data.

(3) In the distributed processing method according to the above-mentioned item (2), the managing (the division point management module 18) includes dividing the output set (200) into a plurality of subsets at the division point, which is generated based on the division command, and assigning numbers (the set number 202) in an output order of the division point to the plurality of subsets to manage the plurality of subsets.

With the configuration described above, data having the same set number 202 is equivalent among all servers 1, and data deletion, the prevention of duplicate output, data supplementation, and the like in the output set 200 can therefore be managed with the set number 202.

(4) In the distributed processing method according to the above-mentioned item (3), the determining the output order (the commutativity determination module 14) includes classifying the data to be output by the partial order delivery into classifications of pieces of data having a commutative relationship, and determining the output order of the data based on commutativity determination information (the commutativity determination tables 300X and 300Y), which defines the division command in advance for each of the classifications.

With the configuration described above, the commutativity determination table 300 is divided for each data series (classification) into the commutativity determination tables 300X and 300Y, and the division command is separated for each data series into the division commands X and Y. Ranges of conflict with the division commands X and Y are thus reduced and fewer conflicts are accordingly caused, which helps to reduce the latency due to the conflict solving module 17.

(5) In the distributed processing method according to the above-mentioned item (2), the outputting the division command (the division control module 400) includes outputting the division command in a given cycle or at given timing.

The configuration described above enables the division control module 400 to adjust the cycle and timing of outputting the division command by taking the frequency of data deletion and the like into consideration. The configuration also enables the division control module 400 to output the division command at timing that has a low risk of data collision, by taking into consideration a time slot in which a request from an application is transmitted.

(6) In the distributed processing method according to the above-mentioned item (2), the plurality of computers include: a client apparatus (3) configured to output the data; and a server (1) configured to execute the receiving (the transmission/reception module 13), the determining the output order (14, 15, 16, 17), the managing (18), and the outputting the division command (the division control module 400) is executed by one of the client apparatus (3) and the server (1).

With the configuration described above, the division control module 400 is run on each client apparatus 3, to thereby control the timing of transmitting the division command and data without cooperating with other computers (other client apparatus 3 and the division control apparatus 2).

When the division control module 400 is run on each server 1, the server 1 receiving data of a specific classification executes division control and then delivers the data to each server, to thereby control the timing of transmitting the division command and the data.

(7) The distributed processing method according to the above-mentioned item (3) further includes deleting, by the plurality of computers (1), the plurality of subsets in an order of the numbers (202), and the determining the output order (14, 15, 16) includes exchanging (Step S23), by the plurality of computers (1), the data including the numbers by the partial order delivery to discard already deleted data (Step S25).

The configuration described above enables the servers 1 to determine which subset has already been deleted, by exchanging the set number 202 of the output set 200, and prevent duplicate data output.

(8) In the distributed processing method according to the above-mentioned item (3), the managing (the division point management module 18) includes treating each of the plurality of subsets as a single piece of data, to thereby treat the output set of the partial order delivery as an output set of total order delivery.

With the configuration described above, partial order delivery can be combined with the technology of total order delivery.

(9) In the distributed processing method according to the above-mentioned item (3), the determining the output order (14, 15, 16, 17) includes determining, when noncommutative data is received, the output order in accordance with a consensus with other computers, and the managing (the division point management module 18) further includes treating the noncommutative data for which the output order has been determined as the division command.

With the configuration described above, the distributed processing system can have a simplified configuration by omitting the generation and transmission of the division command.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are connected to one another.

What is claimed is:

1. A distributed processing method for executing partial order delivery of data on a plurality of computers connected via a network, the distributed processing method comprising:
    receiving the data by the plurality of computers;
    determining, by the plurality of computers, an output order in which the data is output by the partial order delivery;
    managing, by the plurality of computers, the data to be output by dividing the data into a plurality of subsets equivalent among the plurality of computers before the data is stored in an output set, and storing the divided data in the output set; and
    outputting, by the plurality of computers, a division command, which is data noncommutative with the data that is handled in the partial order delivery,
    wherein the managing comprises generating, when the division command is stored in the output set, a division point based on the division command, and managing the output set on a subset-by-subset basis by dividing the output set at the division point,
    wherein the managing comprises dividing the output set into a plurality of subsets at the division point, which is generated based on the division command, and assigning numbers in an output order of the division point to the plurality of subsets to manage the plurality of subsets, and
    wherein the determining the output order comprises classifying the data to be output by the partial order delivery into classifications of pieces of data having a commutative relationship, and determining the output order of the data based on commutativity determination information, which defines the division command in advance for each of the classifications.

2. The distributed processing method according to claim 1, wherein the outputting the division command comprises outputting the division command in a given cycle or at given timing.

3. The distributed processing method according to claim 1,
    wherein the plurality of computers comprise:
        a client apparatus configured to output the data; and
        a server configured to execute the receiving, the determining the output order, and the managing, and
    wherein the outputting the division command is executed by one of the client apparatus and the server.

4. The distributed processing method according to claim 1, further comprising deleting, by the plurality of computers, the plurality of subsets in an order of the numbers,
    wherein the determining the output order comprises exchanging, by the plurality of computers, the data including the numbers by the partial order delivery to discard already deleted data.

5. The distributed processing method according to claim 1, wherein the managing comprises treating each of the plurality of subsets as a single piece of data, to thereby treat the output set of the partial order delivery as an output set of total order delivery.

6. The distributed processing method according to claim 1,
wherein the determining the output order comprises determining, when noncommutative data is received, the output order in accordance with a consensus with other computers, and
wherein the managing comprises treating the noncommutative data for which the output order has been determined as the division command.

7. A distributed processing system, comprising: a plurality of computers connected via a network, each computer including a processor, a memory and an interface, the respective memories of each computer storing instructions that when executed by the respective processors, configure the processors to:
receive the data;
determine an output order in which the data is output by the partial order delivery;
manage the data to be output by dividing the data into a plurality of subsets equivalent among the plurality of computers before the data is stored in an output set, and storing the divided data in the output set; and
output a division command, which is data noncommutative with the data that is handled in the partial order delivery,
wherein the managing comprises generating, when the division command is stored in the output set, a division point based on the division command, and managing the output set on a subset-by-subset basis by dividing the output set at the division point,
wherein the managing comprises dividing the output set into a plurality of subsets at the division point, which is generated based on the division command, and assigning numbers in an output order of the division point to the plurality of subsets to manage the plurality of subsets, and
wherein the determining the output order comprises classifying the data to be output by the partial order delivery into classifications of pieces of data having a commutative relationship, and determining the output order of the data based on commutativity determination information, which defines the division command in advance for each of the classifications.

8. A server, comprising:
a processor, a memory and an interface, the memory storing instructions that when executed by the processor, configures the processor to:
receive the data;
determine an output order in which the data is output by the partial order delivery;
manage the data to be output by dividing the data into a plurality of subsets equivalent among the server and other servers before the data is stored in an output set, and storing the divided data in the output set; and
output a division command, which is data noncommutative with the data that is handled in the partial order delivery,
wherein the managing comprises generating, when the division command is stored in the output set, a division point based on the division command, and managing the output set on a subset-by-subset basis by dividing the output set at the division point,
wherein the managing comprises dividing the output set into a plurality of subsets at the division point, which is generated based on the division command, and assigning numbers in an output order of the division point to the plurality of subsets to manage the plurality of subsets, and
wherein the determining the output order comprises classifying the data to be output by the partial order delivery into classifications of pieces of data having a commutative relationship, and determining the output order of the data based on commutativity determination information, which defines the division command in advance for each of the classifications.

* * * * *